United States Patent [19]

Svanberg

[11] Patent Number: 4,569,626
[45] Date of Patent: Feb. 11, 1986

[54] COMBINED ELEVATING PLATFORM AND MOUNTING DEVICE FOR A TAILGATE ELEVATOR AND PLATFORM AND SUPPORT MEMBER FOR SUCH A COMBINATION

[75] Inventor: Björn Svanberg, Tranås, Sweden

[73] Assignee: Z-Lyften Produktion AB, Katrineholm, Sweden

[21] Appl. No.: 624,502

[22] PCT Filed: Oct. 25, 1983

[86] PCT No.: PCT/SE83/00362
§ 371 Date: Jun. 19, 1984
§ 102(e) Date: Jun. 19, 1984

[87] PCT Pub. No.: WO84/01751
PCT Pub. Date: May 10, 1984

[30] Foreign Application Priority Data

Oct. 25, 1982 [SE] Sweden .................................. 8206048

[51] Int. Cl.⁴ .................................................. B60P 1/44
[52] U.S. Cl. ........................................ 414/557; 414/917
[58] Field of Search ............... 414/546, 547, 556, 557, 414/558, 917

[56] References Cited

U.S. PATENT DOCUMENTS 2,348,993  5/1944  Novotney ......................... 414/557
2,525,424 10/1950  Novotney ......................... 414/557

Primary Examiner—Robert G. Sheridan
Attorney, Agent, or Firm—Sughrue, Mion, Zinn, Macpeak and Seas

[57] ABSTRACT

An elevating platform (1) is attached to the tailgate elevator (2) of an automotive truck by means of a support member (7). The support member is accommodated in a recess (1a) provided in the thick end of the platform and is connected thereto by the horizontal pivot shaft (6) of the platform, against which shaft a lifting arm (4) co-acting with a lifting cylinder (3) engages. The elevating platform (1) may optionally be freely pivotable relative to the support member (7), in which case the platform can be manually swung to a vertical position. This upward swinging of the platform can alternatively be effected by a rocker cylinder device (5, 5a), in which case the platform and support member are joined together by a screw (10). The platform (1) may comprise extruded profiled sections, in which the support member accommodating recess (1a) can be formed by milling.

7 Claims, 4 Drawing Figures

COMBINED ELEVATING PLATFORM AND MOUNTING DEVICE FOR A TAILGATE ELEVATOR AND PLATFORM AND SUPPORT MEMBER FOR SUCH A COMBINATION

FIELD OF INVENTION

The present invention relates to a combined elevating platform and mounting device for attaching the platform to the tailgate elevator of an automotive truck, said tailgate elevator being of the parallellogram type and including a lifting cylinder linked to a lifting arm and a supporting arm which may comprise a rocker cylinder, said lifting arm and said supporting arm at one end engaging a support member connected to the elevating platform via horizontal pivot shafts at a mutual distance for pivoting the elevating platform by means of the lifting cylinder between a lower and an upper position, said elevating platform tapering from its forward thick end to which the support member is connected towards its rear end.

According to another aspect the invention also refers to an elevating platform and a support member, respectively, for such a combination.

BACKGROUND ART

Several different kinds of elevating platforms, together with their associated support members, are known to the art. The design of the support member depends, to a large extent, on the kind of tailgate elevator for which it is intended, and to the rocker or pivot arrangement used in each individual case.

In many cases it is difficult to provide a simple and reliable mounting device for connecting the support member to the tailgate elevator and the elevating platform. For example, the support member must be capable of taking up the high loads and stresses to which the platform is subjected, and to transfer these loads and stresses to the tailgate elevator while, at the same time, enabling the elevating platform to be swung readily in the vertical plane. In many cases, it must also be possible to raise the platform readily to a vertical position, even when the platform is located in its lower position. Otherwise, when occupying its lower position the platform may prevent the truck from being reversed closely into a loading bridge. It is sometimes necessary to bring the truck as close as possible to the loading bridge, especially when loading is to be carried out under cover with respect to weather conditions.

In certain cases, elevating platforms of the kind mentioned are constructed from extruded sections. In cases such as these, it is particularly difficult to provide a simple and reliable means of mounting or attachment with respect to the elevating platform, among other things because it must be possible to vary the dimensions of the support member and pivot shaft, for example in dependence upon the number of sections in the complete platform.

U.S. Pat. No. 2,348,993 (Novotney) describes an elevating gate whose support members take the shape of brackets secured to a transverse tie rod. The gate which is lifted to its upper position by means of a hoist rests on the bracket members and is pivotable relative thereto about a further shaft engaged by outer support arms which have a bend at their outer ends.

U.S. Pat. No. 2,525,424 (Novotney) describes a development of this arrangement in which the hoist is replaced by a central frame supporting a hydraulic cylinder and piston assembly. Further, there is added a gate counterbalancing mechanism including torsion springs between said frame and gate.

None of these prior documents presents a solution to the above problems, especially not if the elevating platform or gate comprises extruded sections.

BRIEF DESCRIPTION OF THE INVENTION

In accordance with the invention, the aforementioned problem is solved in a simple and purposeful fashion by locating the support member—which is separate from the platform and preferably demountable therefrom—in a recess formed in the thick end of the elevating platform, and by connecting the support member to said elevating platform via the horizontal pivot shaft or pin thereof, against which shaft the lifting arm also pivotally engages.

Because the support member, the lifting arm and the elevating platform are held in position by one and the same shaft, which also serves as the elevating-platform pivot, there is obtained a simplified attachment arrangement. The advantage obtained with such an arrangement is particularly apparent when the elevating platform is constructed from extruded sections. In this case, only one support member accommodating recess is formed in the appropriate section, whereafter the various components are connected together in the aforesaid simple fashion. This affords the additional advantage that the elevating platform can be delivered together with its associated support member, whereupon the elevating platform can be mounted onto the automotive truck for which it is intended, subsequent to effecting a simple milling or cutting operation. When mounting the support member welding operations which normally are both complicated and expensive may be avoided.

The same type of elevating platform can also be arranged to co-act with support members of differing size, hole diameters etc. in dependence upon prevailing circumstances. This greatly simplifies the problem of stocking and handling such platforms.

It is preferred in practice that in the horizontal position of the elevating platform, the support member engages the platform along a substantial part of the height of the recess, and preferably along the whole height thereof. In this way, the loads and stresses dealt with by the support member are distributed over a relatively wide area, which enhances the reliability of the arrangement.

According to one embodiment of the invention, the elevating platform is pivotable relative to the support member, and can be swung to a vertical position through the application of an external force, for example a manual force. In this case, the support member remains in position when the elevating platform is swung upwardly, which can thus be effected in an extremely ready manner, even when the elevating platform occupies its lower position, for example, in order to enable the truck to be reversed to a position in which the said truck is located close to the loading bridge.

The elevating platform, however, may instead be connected to the support member by means of, for example, one or more bolts or screws and be arranged to pivot between a horizontal and vertical position by means of a rocker cylinder or like device engaging the support member.

In the first mentioned case, i.e. when the elevating platform is pivotable relative to the support member, the support member may alternatively be provided with a depending lug, pivotably connected to a rocker cylinder device, the piston rod of which engages the elevating platform for swinging said platform in the vertical plane.

A rocker cylinder device can, instead, be arranged to engage a pivot shaft associated with the support member at a lower level and to one side of the point of engagement of the elevating platform. The rocker cylinder device is then maintained at a constant length and serves as the support arm during pivoting of the elevating platform between said upper and said lower position. The rocker cylinder is, however, extended and retracted, respectively, for swinging the platform from horizontal to vertical position and vice versa.

The invention also relates to an elevating platform and a support member for a combination of the above kind, the essential features of said platform and support member being given in appertaining claims 7 and 9, respectively.

So that the invention will be more readily understood and further features thereof made apparent, preferred embodiments of the invention will now be described with reference to the accompanying drawing.

DESCRIPTION OF PREFERRED EMBODIMENTS

Figure 1:
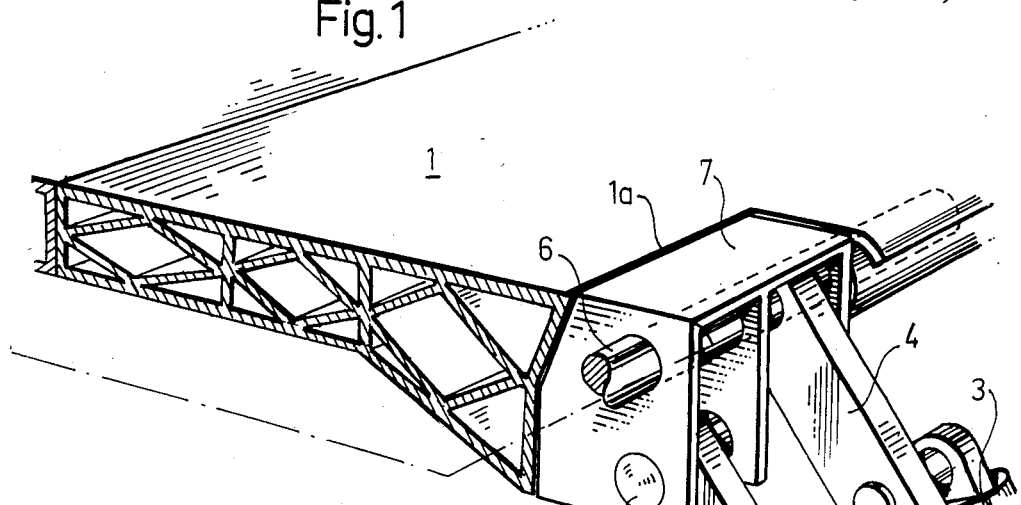
FIG. 1 is a partially cut-away view in perspective of the tailgate elevator of an automotive truck, with associated support member and elevating platform according to the present invention.

An automotive truck (not shown) carries at its rear end an elevating platform 1 by means of a tailgate elevator 2 of the parallellogram type. Although the elevating platform is arranged to co-act with two such tailgate elevators arranged in duplicate, only one tailgate elevator is shown, for the sake of simplicity.

The tailgate elevator includes a lifting cylinder 3, which is connected to a lifting arm 4, which engages the elevating platform 1 via a support member 7, which will be described in more detail hereinafter. The tailgate elevator is also arranged to co-act with a lifting arm, which has the form of a rocker cylinder devices with associated piston rod 5a. The piston rod 5a engages the support member 7 via a pivot pin 7a.

The elevating platform 1 has a planar undersurface and tapers from its forward, thick end, in the region of which the support member is located. In the illustrated embodiment, the elevating platform comprises two or more extruded sections, which are welded together. Alternatively, the various sections may be pivotably connected together, in order to enable the elevating platform to be collapsed in concertina fashion. Milled in the thick end of the elevating platform 1 is a recess 1a for accommodating the support member 7. The length of the recess 1a corresponds to the length of the support member 7, and in the position illustrated in FIG. 1 the height of the support member corresponds to the height of the recess 1a, i.e. so that the support member engages the recess in the elevating platform via a surface of substantial size.

The support member 7 is connected to the elevating platform 1 via a pivot shaft 6, which also serves as the horizontal pivot shaft of the elevating platform. In addition, the lifting arm 4 is pivotally connected to the aforesaid pivot shaft or bolt 6.

In the illustrated embodiment, attachment of the support member has been achieved by milling the recess 1a in the thick end of the elevating platform, and then introducing the support member 7 into the said recess and connecting the said member to the elevating platform 1 and the lifting arm 4 by means of bolts 6, said bolts passing through holes bored in the sides of the support member and aligned with an elongate hole 1b passing through the platform. The bolts 6 are held in place by transverse pins (not shown).

The piston rod 5a of the rocker cylinder device 5 is then connected to the pivot pin 7a, which is located beneath the pivot shaft 6 and to one side of the lifting arm 4. The manner of attachment of the various components is also illustrated in FIG. 3.

Figure 2:
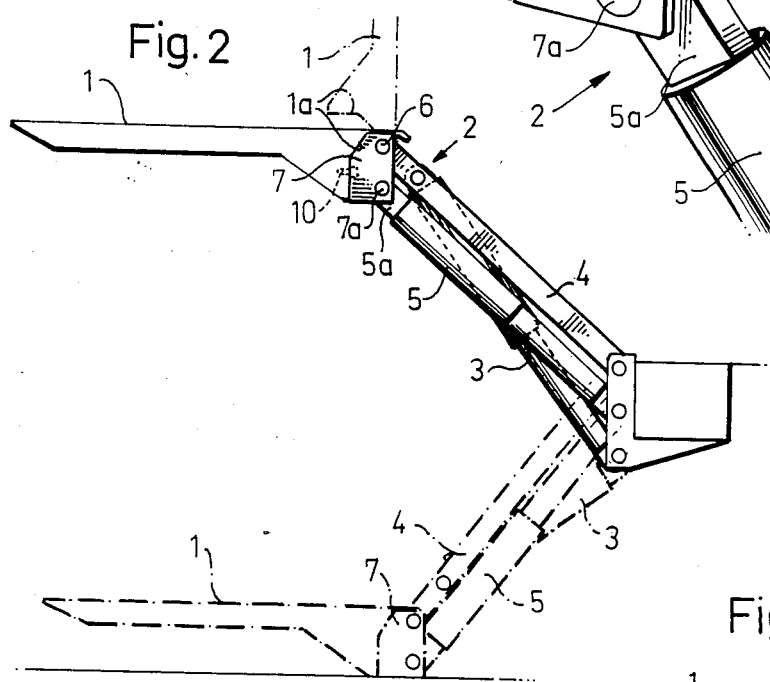
FIG. 2 is a side view which illustrates in principle pivoting of the elevating platform shown in FIG. 1, between its lower and its upper positions.

FIG. 2 illustrates in principle, pivoting of the elevating platform 1 between its upper and its lower position, the figure also illustrating how the elevating platform can be swung vertically in the upper position by means of the rocker cylinder 5.

Figure 3:
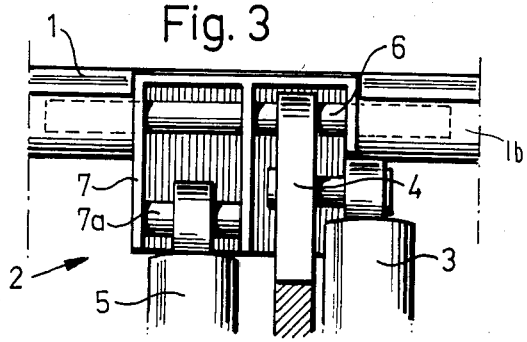
FIG. 3 is a plan view illustrating part of the elevating platform and associated support member, together with the attachment of the lifting arm and rocker cylinder device.

In the embodiment illustrated in FIGS. 1-3, the support member 7 and the elevating platform 1 are joined together by means of a screw 10. In this case, the support member will therefore accompany the elevating platform when it is swung to its vertical position.

Alternatively, however, the sole connection between the support member 7 and the elevating platform 1 may comprise the shaft 6, in which case the elevating platform—even when occupying its lower position—can thus be swung relative to the support member 7, by means of an external force, for example a manual force. When the elevating platform can be pivoted upwardly by means of an external force—even when the platform occupies its upper position—the rocker cylinder 5 and the piston rod 5a can be replaced with a support link (not shown).

Figure 4:
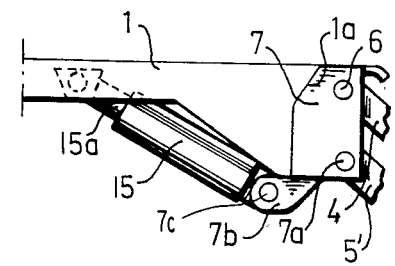
FIG. 4 is a cross-sectional view of a modified embodiment having a rocker cylinder device inserted between the support member and elevating platform.

FIG. 4 illustrates an alternative arrangement in which the elevating platform 1 can be pivoted relative to the support member 7, and thus where there is no fixed connection between the elevating platform and support member.

In this embodiment the support member 7 is provided with a downwardly extending lug 7b, in which there is accommodated a pivot shaft 7c which is connected to a rocker cylinder device 15. The piston rod 15a of the rocker cylinder device engages the underside of the elevating platform 1. Instead of the rocker cylinder device illustrated in FIGS. 1-3, there is used in the FIG. 4 embodiment a simple support arm 5'.

In those cases, where the support member 7 and the elevating platform 1 are rigidly connected together, any suitable form of connecting means may be used. Instead of a screw 10, the support member and/or the elevating platform may be provided with a hook-shaped member arranged to engage a corresponding member on the other part. Alternatively, other kinds of readily disconnectable coupling means can be used.

In certain cases, it may be desirable to be able to swing the elevating platform beyond the vertical position, for example to a position which is inclined at 135° to the horizontal. Such an arrangement can also readily be provided with the use of a support member according to the invention.

From the above description it follows that the elevating platform 1 may comprise one or more extruded sections. In the region of the forward edge of one such section there is an elongate bore or hole 1b extending in parallel with said forward edge.

The platforms may be delivered along with support members of different size. Later on it is determined which support member shall be used for a certain application.

Corresponding recesses 1a are milled and the combined platform and mounting device are put together in the described simple manner avoiding welding operations. A substantial reduction of costs both for producing and storing platforms and support members and for mounting the parts together has then been achieved.

When reference is made in the present application to "lifting cylinder" and "rocker cylinder", these references can, in certain instances, also relate to the associated piston rods. It is irrelevant whether the piston rod of a particular cylinder engages the, for example, support member or whether it is the cylinder itself which engages said member.

I claim:

1. A combined elevating platform (1) and mounting device for attaching the platform to the tailgate elevator (2) of an automotive truck, characterized by: said tailgate elevator being of the parallelogram type and including a lifting cylinder (3) linked to a lifting arm (4) and a supporting arm (5, 5a), said lifting arm and said supporting arm at one end individually engaging a support member (7) connected to the elevating platform via spaced horizontal pivot shafts (6a, 7a) for pivoting the elevating platform by means of the lifting cylinder between a lower and an upper position, said elevating platform tapering from a forward thick end thereof to which the support member is connected towards a rear end, wherein the support member (7) is a separate part from the elevating platform (1), is demountable therefrom, is received in a recess (1a) in the thick end of the elevating platform, and is connected to the elevating platform via one of the horizontal pivot shafts (6), said one shaft being pivotally engaged by the lifting arm (4).

2. A combination according to claim 1, wherein the support member (7), in the horizontal position of the elevating platform, engages the elevating platform along a substantial part of the height of the recess (1a).

3. A combination according to claim 2, wherein the elevating platform (1) is pivotable relative the support member (7), and can be swung to a vertical position by application of an external force.

4. A combination according to claim 3, wherein the support member (7) has a downwardly extending lug (7b) pivotally connected to a rocker cylinder device (15), a piston rod (15a) of which engages an underside of the elevating platform (1) to enable said platform to be swung in the vertical plane (FIG. 4).

5. A combination according to claim 2, wherein said support arm comprises a rocker cylinder (5, 5a) maintained at a uniform length when the platform is pivoted between its lower and its upper position, said rocker cylinder being extendible and retractable to swing said platform from a horizontal to a vertical and back to a horizontal position, and wherein the support member (7) is secured to the platform (1) by releasable means (10).

6. A combination according to claim 5, wherein the rocker cylinder (5, 5a) engages a pivot shaft (7a) associated with said support member (7) at a lower level than and to one side of the point of engagement of the lifting arm (4).

7. A combination according to claim 1, wherein said platform (1) comprises extruded sections, and, in the region of the forward thick end, an elongate bore (1b) is defined extending through at least a substantial part of the platform, said bore being adapted to receive one of said pivot shafts (6) to connect said platform to the support member (7).

* * * * *